Patented Aug. 4, 1936

2,049,721

UNITED STATES PATENT OFFICE 2,049,721

PROCESS FOR PURIFYING NICKEL

René Marie Victor Perrin, Paris, France, assignor to Societe d'Electrochimie, d'Electrometallurgie et des Acieries Electriques d'Ugine, Paris, France, a corporation of France No Drawing. Application February 20, 1934, Serial No. 712,256. In France March 1, 1933

11 Claims. (Cl. 75—82)

Crude nickel and scraps of impure nickel such as those of commerce, contain a certain number of harmful impurities amongst which are sulphur, iron, silicon, carbon, manganese, magnesium and oxygen.

The present invention brings about the elimination of these impurities in an extremely short time by the application of the process of violent metal-slag intermixing described with reference to the purification of steel in applications for patents Ser. Nos. 584,583 and 584,584, both filed January 2, 1932.

The invention consists essentially for this purpose, in producing an intense and violent intermixing between impure nickel in the molten state and a molten very fluid slag of suitable composition so that the said slag enters into turbulent emulsion with the nickel due to the violent intermixing. In these conditions extraordinary reaction speeds are established, which permit in particular the operation of purification to be carried out without using any means of external heating.

Having regard to the diversity of the impurities to be eliminated complete purification cannot always be effected in a single operation with a single type of slag and may necessitate the successive action of several slags. Moreover, in order to render the elimination of one impurity very far reaching, it may be necessary to repeat several times by the same process the action of the same type of slag, replacing each time the slag which has been enriched in impurities, by fresh slag.

Thus, the operation of purification will comprise, according to what it is desired to obtain, individually or two or three in combination of the following four operations, or all of them effected in a chosen order.

1. Violent and intense intermixing of the molten nickel with a molten, fluid, and essentially basic slag containing no nickel oxide.

By this operation, with the addition if desired of carbon, a considerable desulphurization of the nickel is effected by the reactions:

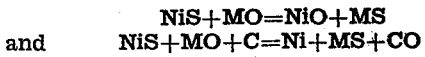

M being an alkali or alkaline earth metal. The principal constituents of the slag will thus be alkali—and (or) alkaline earth oxides combined in such proportions that the fluidity of the slag is the greatest possible at the temperature of the operation. To increase this fluidity a small quantity of $SiO_2$ or $TiO_2$ may be added; too considerable an addition of these oxides will be antagonistic to desulphurization which can only be effected if the slag contains oxide MO in the free state.

2. Intense and violent intermixing of the molten metal with a molten slag which is fluid and basic or neutral, containing free nickel oxide.

By this operation there is produced:

(a) A desulphurization—NiS dissolves partially in slags containing nickel oxide and which are not acid, and there is also evolved $SO_2$ which is formed by oxidation.

(b) A very considerable elimination from the nickel of the impurities, of which the oxides have, with respect to the molecule of oxygen a higher heat of formation than NiO, and act in the slags as acids which is the case in particular with arsenic, antimony and silicon.

(c) A partial elimination of the impurities the oxides of which have with respect to the molecule of oxygen a higher heat of formation than NiO, and act as bases which is the case in particular with manganese, iron and magnesium.

In this case the slags are constituted like these of the preceding operation 1, but contain also NiO.

3. Violent and intense intermixing of the molten nickel with a molten slag which is fluid and acid, containing nickel oxide which is thus partially in the free state and partially combined with the acid constituent of the slag such as $SiO_2$ or $TiO_2$.

By this operation there is produced:

(a) A partial elimination of impurities, the oxides of which have with respect to the molecule of oxygen a higher heat of formation than NiO and are acid.

(b) A very considerable elimination of the impurities, the oxides of which have with respect to the molecule of oxygen a higher heat of formation than NiO and are basic.

In this case the essential constituents of the slags will be acid oxides like $SiO_2$ and $TiO_2$, on neutral oxides like $Al_2O_3$; the slags will also contain NiO and oxides which are practically not reducible by nickel, like MgO, CaO, etc., added in quantities and in combinations such that the slag is very fluid.

4. Intense and violent intermixing of the molten nickel with a molten fluid slag, preferably acid, which contains no nickel oxide or very little, with the essential object of deoxidizing the nickel by solution of the nickel oxide itself dissolved in the nickel, and if necessary of the other oxides dissolved in the nickel like FeO or MnO, etc.

In this latter case deoxidation is accompanied by purification from Fe, Mn, etc.

If moreover it is desired to render the deoxidation of the nickel very far reaching, it is advantageous to add before intermixing or during intermixing or even between two successive intermixings, iron or better still manganese or magnesium.

These substances transform NiO to a great extent into FeO or MnO or MgO and these oxides, which are less soluble than NiO in the nickel, pass for the greatest part during intermixing into the slag, which permits more oxygen to be eliminated. Obviously substances other than Fe, Mn, or Mg can be used.

The constituents of the slags in this case are the same as those provided in the paragraph 3 above. The slags only differ by the very small content of NiO and this permits deoxidation. They may also contain FeO or MnO.

In a general manner the nickel of slags containing, after use, NiO, can be recovered by reduction of the latter with deoxidizing agents such as carbon in particular, the reduction of NiO having priority over the reduction of the other oxides of the slags.

The method of intermixing matters little, only two conditions are essential:

1. The slags must fluid so as to be capable of entering into emulsion in the metal.
2. The intermixing must be violent and intense so as to permit the formation of this emulsion. The duration of this may be the shorter the better the slag has been finely divided and evenly dispersed throughout the molten metal.

With this object, mechanical means permitting the mass of metal to fall violently upon the mass of the slag so that it crushes the slag by its weight, are particularly recommended as being the most efficacious.

But other means, such for example as agitation of the mass of molten metal with the mass of molten slag by gaseous means may be employed, provided that molten synthetic and fluid slags must be used, the only condition permitting very rapid reactions, for slags which are ill molten or viscous cannot give the desired result in an extremely short time.

I claim:

1. Process for purifying crude nickel and scraps of impure nickel consisting in violently intermixing with the molten nickel a molten and very fluid slag capable of extracting the impurities to be eliminated from the nickel, the violence of the intermixing being such that there is produced a dispersion of the slag in a state of fine division in the metal and a vigorous turbulence of the mass of the metal and the slag producing an almost instantaneous elimination of the said impurities.

2. Process for purifying crude nickel and scraps of impure nickel consisting, in order to eliminate the sulphur, in violently intermixing with the molten nickel a molten and very fluid basic slag which contains no nickel oxide and is constituted with the basis of oxides of the group consisting of the alkali and alkaline earth oxides, the violence of the intermixing being such that there is produced a dispersion of the slag in a state of fine division in the metal and a vigorous turbulence of the mass of the metal and of the slag producing an almost instantaneous desulphurization.

3. Process for purifying crude nickel and scraps of impure nickel consisting, in order to eliminate the sulphur, in violently intermixing with the molten nickel while adding carbon to the bath, a molten and very fluid basic slag which contains no nickel oxide, constituted with a basis of oxides of the group consisting of the alkali and alkaline earth oxides, the violence of the intermixing being such that there is produced a dispersion of the slag in a state of fine division in the metal and a vigorous turbulence of the mass of the metal and of the slag producing an almost instantaneous desulphurization.

4. Process for purifying crude nickel and scraps of impure nickel consisting, in order to eliminate the sulphur, in violently intermixing with the molten nickel a molten and very fluid basic slag containing no nickel oxide, constituted with a basis of oxides of the group consisting of the alkali and alkaline earth oxides and containing a very small quantity of fluxing oxides, the violence of the intermixing being such that there is produced a dispersion of the slag in a state of fine division in the metal and a vigorous turbulence of the mass of the metal and of the slag producing an almost instantaneous desulphurization.

5. Process for eliminating from crude nickel and scraps of impure nickel primarily the impurities the oxides of which have with respect to the molecule of oxygen a higher heat of formation than nickel oxide and act in the slag as acid, like arsenic, antimony and silicon, consisting in violently intermixing with the molten nickel a molten and very fluid slag of non-acid character comprising oxides of the group consisting of the alkali and alkaline earth oxides and free nickel oxide, so as to ensure the elimination of the said impurities the oxides of which are acid, at the same time as a desulphurization and a partial elimination of the said impurities, the oxides of which are basic, the violence of the intermixing being such that there is produced a dispersion of the slag in a state of fine division in the metal and a vigorous turbulence of the mass of the metal and of the slag, producing in an extremely short time the elimination of the said impurities.

6. Process for eliminating from crude nickel and scraps of impure nickel primarily the impurities the oxides of which have with respect to the molecule of oxygen a higher heat of formation than nickel oxide and act in the slag as bases, like manganese, iron, magnesium, consisting in violently intermixing with the molten nickel a molten and very fluid acid slag comprising oxides of acid character and nickel oxide partly in the free state and partly combined with acid constituents, and containing also oxides of non-acid character, practically non-reducible by nickel, which increase the fluidity of the slag, the various oxides forming the slag being in such relative proportions as to insure the elimination of the said impurities the oxides of which are basic and to effect at the same time a partial elimination of the impurities of the bath the oxides of which are acid, the violence of the intermixing being such that there is produced a dispersion of the slag in a state of fine division in the metal and a vigorous turbulence of the mass of the metal and of the slag producing in an extremely short time the elimination of the said impurities.

7. Process for removing the oxygen from crude nickel and scraps of impure nickel, consisting in violently intermixing with the molten nickel a molten and very fluid slag poor in nickel oxide and possessing a high dissolving power with respect to nickel oxide, comprising acid oxides so as to show an acid character, so that the nickel oxide as well as other oxides dissolved in the nickel are absorbed by this slag, the violence of the intermixing being such that there is produced a dispersion of the slag in a state of fine division in the metal and a vigorous turbulence of the mass of the metal and of the slag producing the almost instantaneous removal of the said oxides from the nickel.

8. Process for removing the oxygen from crude nickel and impure scraps, consisting in violently intermixing with the molten nickel a molten and fluid slag poor in nickel oxide, capable of absorbing the oxides dissolved in the nickel, and adding to the bath metals which oxidize at the expense of the nickel oxide, and the oxides of which are more readily absorbable than this latter in the slag, the violence of the intermixing being such that there is produced a dispersion of the slag in a state of fine division in the metal and a vigorous turbulence of the mass of the metal and of the slag producing the almost instantaneous removal of the said oxides from the nickel.

9. Process for purifying crude nickel and scraps of impure nickel, consisting in violently intermixing with the molten nickel a molten and very fluid slag proceeding in a convenient order of succession with the elimination of sulphur by the employment of a basic slag free from nickel oxide; with the elimination of the impurities, the oxides of which are acid by the employment of a slag comprising oxides of non-acid nature and containing free nickel oxide; with the elimination of the impurities the oxides of which are basic by the employment of a slag comprising oxides of acid nature and nickel oxide; and with the removal of the oxides dissolved in the nickel by the employment of a slag poor in nickel oxide and having a high power of absorption with respect to nickel oxide; the violence of the intermixing at each operation being such that there is produced a dispersion of the slag in a state of fine division in the metal and a vigorous turbulence of the mass of the metal and of the slag producing the almost instantaneous elimination of the impurities in view.

10. Process for purifying crude nickel and scraps of impure nickel, consisting in violently intermixing with the molten nickel a molten and very fluid slag capable of extracting the impurities to be removed from the nickel, the violence of the intermixing being such that there is produced a dispersion of the slag in a state of fine division in the metal and a vigorous turbulence of the mass of the metal and of the slag producing the almost instantaneous elimination of the said impurities, and in subsequently recovering the nickel with which the slag is enriched by the violent intermixing, by submitting the said slag to a reducing treatment by means of deoxidizing agents.

11. Process for purifying crude nickel and scraps of impure nickel, consisting in violently intermixing with the molten nickel a molten and very fluid slag capable of extracting impurities to be eliminated from the nickel by producing an intense agitation by means of gases incapable of interfering with the purifying operations, the violence of the gaseous intermixing being such that there is produced a dispersion of the slag in a state of fine division in the metal and a vigorous turbulence of the mass of the metal and of the slag producing the almost instantaneous elimination of the said impurities.

RENÉ MARIE VICTOR PERRIN.